Sept. 15, 1970     V. P. CARACCIOLO     3,528,553
PERMEATION SEPARATION DEVICE FOR SEPARATING FLUIDS
Filed Nov. 26, 1968     3 Sheets-Sheet 1
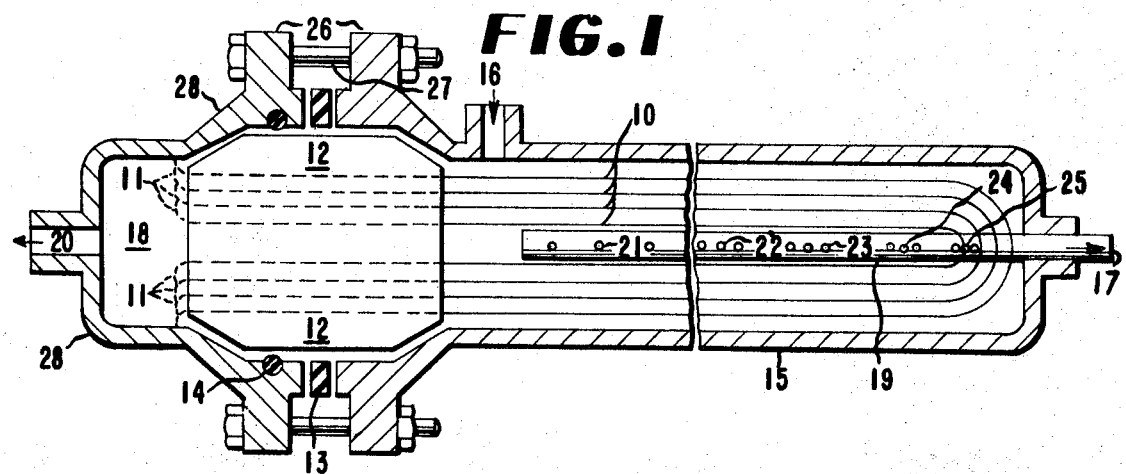
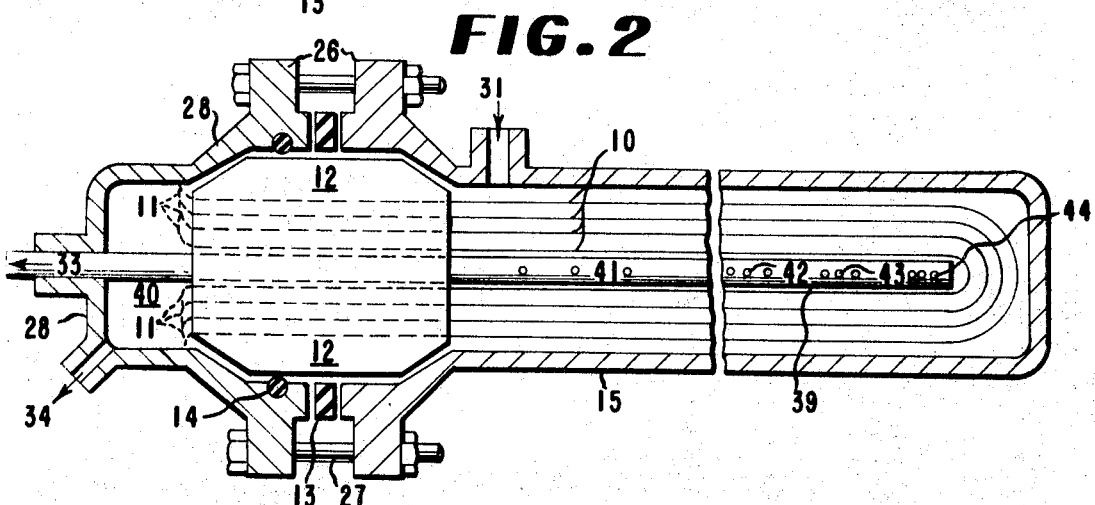
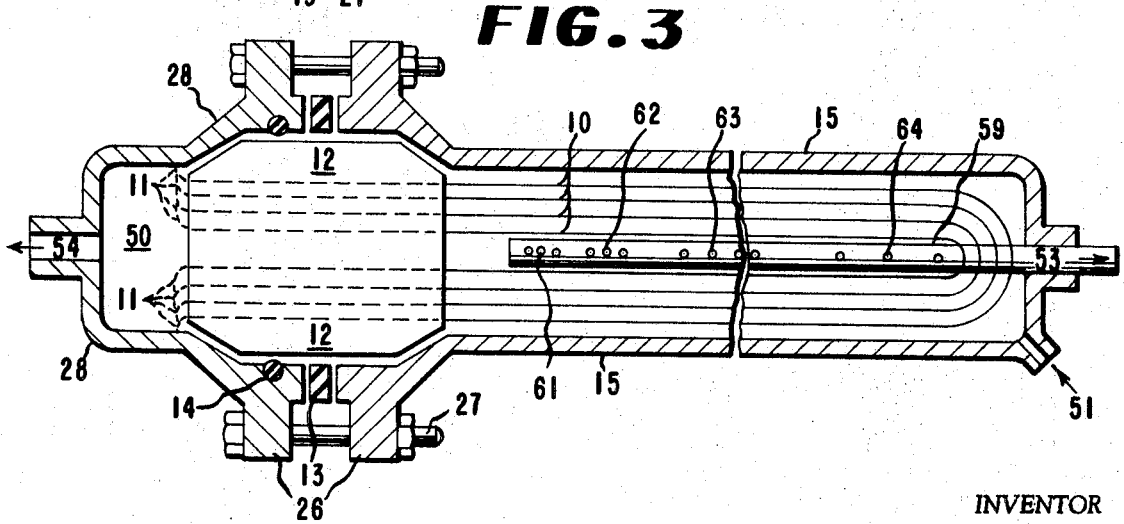
INVENTOR
VINCENT P. CARACCIOLO
BY *Gary A. Samuels*
ATTORNEY Sept. 15, 1970     V. P. CARACCIOLO     3,528,553
PERMEATION SEPARATION DEVICE FOR SEPARATING FLUIDS
Filed Nov. 26, 1968     3 Sheets-Sheet 2
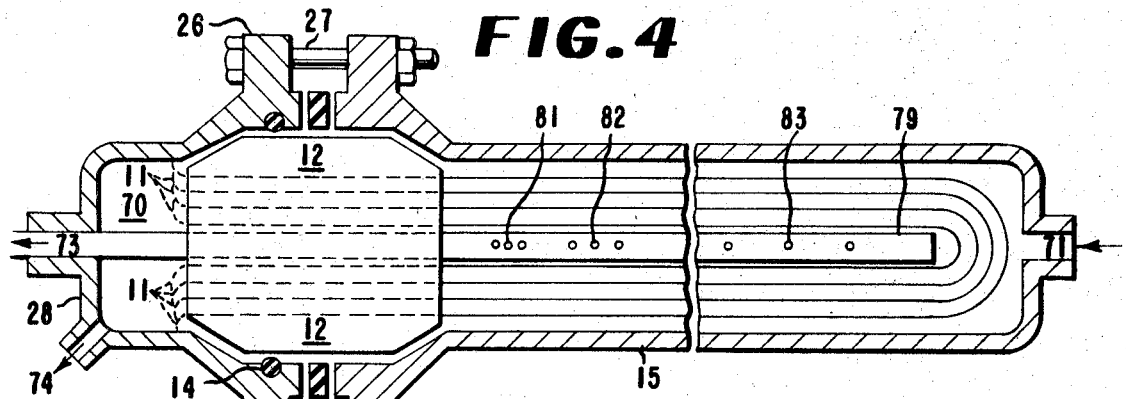
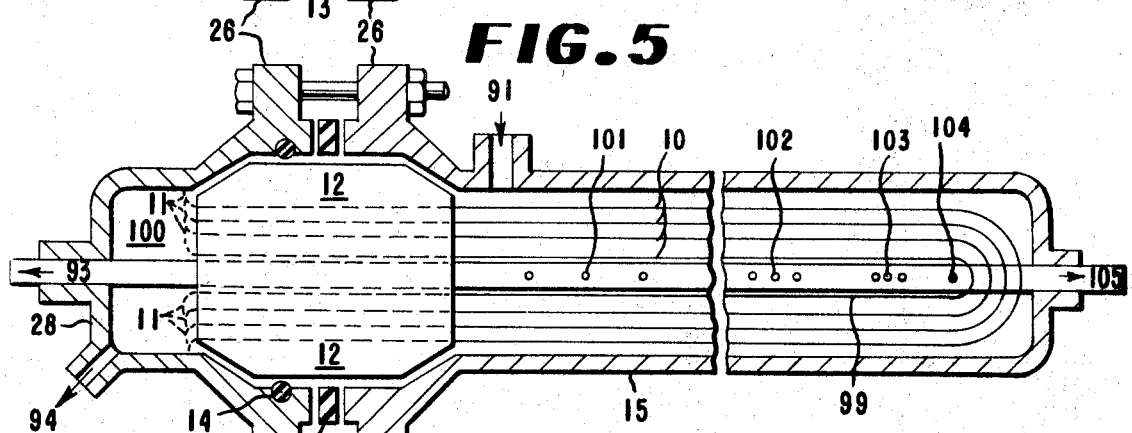
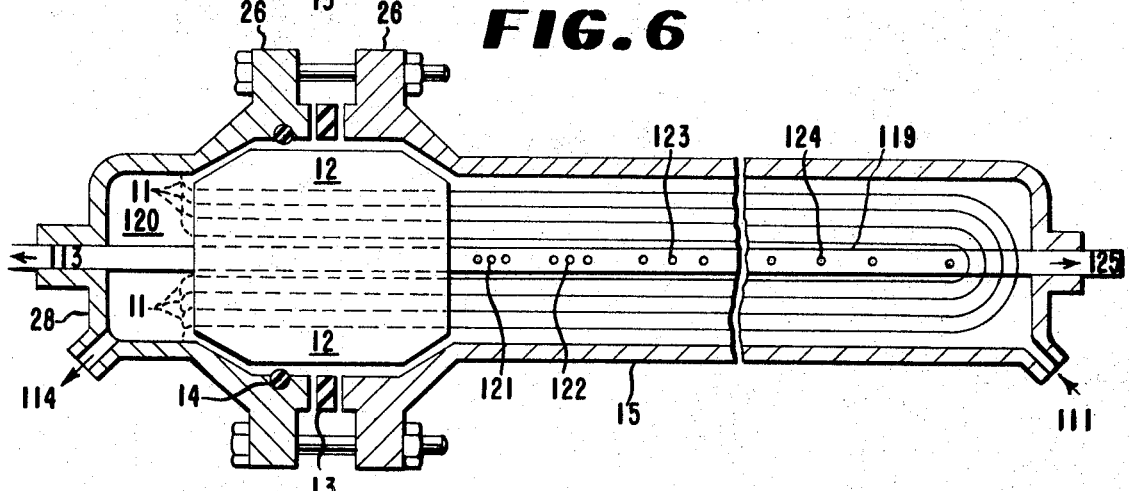
INVENTOR
VINCENT P. CARACCIOLO
BY
ATTORNEY

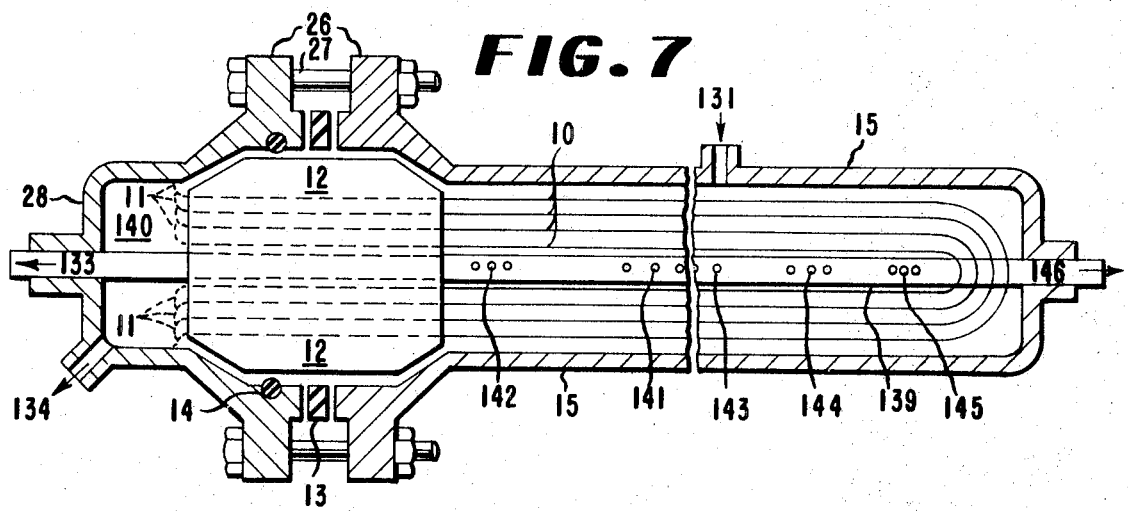

United States Patent Office 3,528,553
Patented Sept. 15, 1970

3,528,553
PERMEATION SEPARATION DEVICE
FOR SEPARATING FLUIDS
Vincent P. Caracciolo, Wilmington, Del., assignor to E. I. du Pont de Nemours and Company, Wilmington, Del., a corporation of Delaware
Filed Nov. 26, 1968, Ser. No. 779,005
Int. Cl. B01d 13/00
U.S. Cl. 210—321                   10 Claims

ABSTRACT OF THE DISCLOSURE

A permeation separation apparatus which comprises an elongated jacket containing therein a plurality of long, thin, hollow, selectively permeable fibers which extend substantially the length of said jacket and which form a U-shaped loop at one end of said jacket so that both ends of each fiber extend through the opposite end of the jacket into a receiving chamber. The fibers form a bundle which substantially fills the interior of the jacket. A perforated tube extends through at least one end of said jacket and is positioned within the fiber bundle along the approximate center axis of the bundle for substantially the length of the bundle. The perforations of the tube are spaced around its circumference and along the length of the portion of the tube within the bundle. The jacket and the chamber each contain fluid conduit means.

BACKGROUND OF THE INVENTION

Field of the invention

This invention relates to an apparatus and method for uniformly contacting bundles of long, thin, selectively permeable hollow fiber membranes with a fluid mixture or solution in order to separate the mixture or solution by passing permeable components of the mixture or solution through the membrane.

Description of the prior art

Hollow tubes have long been used for separation or purification of components of liquids and gases. U.S. Pat. 2,411,238 to Zender describes an aqueous dialysis in an apparatus of tubular membranes of pipe size. U.S. Pat. 2,961,062 to Hunter and Hickey shows collections of palladium capillary tubes for separating hydrogen from other gases. U.S. Pat. 2,972,349 to De Wall shows capillary tubes used for oxygenating blood in an artificial lung.

Long, thin, permeable hollow fibers prepared from organic polymers have been found to be useful in permeation separation apparatus by employing the propensity of the fibers to pass one fluid through the fiber walls more easily than other fluids, ions or ingredients. For example, Mahon U.S. Pat. 3,228,877 discloses a permeation separation apparatus composed of a cylindrical jacket containing a multitude of small-diameter, selectively permeable hollow fibers. The fibers extend longitudinally the length of the jacket and through each capped end of the cylinder. The fluid feed mixture is admitted under pressure to the jacket interior where the component desired to be separated passes through the walls of the hollow fibers, down the interior of the hollow fibers, to a collecting vessel. The remainder of the fluid mixture still inside the jacket is drawn off through an outlet port in the jacket.

Another type of permeation separation device which utilizes selectively permeable hollow fibers is described in British Pat. 1,019,881. This device operates in the same manner as the Mahon device, supra, but the configuration of the fibers within the jacket is different. The hollow fibers do not extend the length of the cylinder and emerge at both ends, as they do in the Mahon patent, but rather, the fibers extend the length of the cylinder and are then doubled or looped back the length of the cylinder again so that both ends of the hollow fibers emerge from the same end of the cylindrical jacket. In other words, the hollow fibers form a U inside the jacket with the bottom or looped portion of the fiber at one end of the cylinder and the two ends of the fiber emerging from the other end.

Still another type of permeation separation device is described in McCormack, U.S. Pat. 3,246,764 where the fibers are positioned longitudinally within the cylinder such that one end of each hollow fiber emerges through one end of the cylinder, while the other end of each fiber is sealed off to prevent communication between the interiors of the hollow fibers and the interior of the cylinder. Still other permeator embodiments are described in Maxwell et al. U.S. 3,339,341.

However, the means by which the fluid mixture or solution is introduced into the jacket containing the above-described hollow fibers or tubes does not provide a flow of the fluid mixture or solution which allows maximum contact between the fluid and the fibers or tubes. Maximization of contact is, of course, desirable since the efficiency of the separation to be carried out is dependent thereon, i.e., the effective distribution of fluid feed mixture or solution within the completely assembled device so that the fluid contacts a maximum amount of outer-surface area of the hollow fibers to allow permeation of the desired component, has long been a problem. It has been found that the device of this invention can be employed to provide an effective fluid flow around the fiber surface when the fibers are employed in the final permeation assembly for separating fluid components.

The foregoing art patents disclose that, in general, the devices are manufactured by fabricating the hollow fibers (as described, e.g., in Breen et al., U.S. Pat. 2,999,296; or British Pats. 514,638, 843,179 or 859,814), positioning them longitudinally into a long, closely packed bundle, casting the ends of the fibers in the bundle in a solidifiable liquid resin (usually epoxy) so that upon solidification the long, closely packed bundle is fixed at its ends, while taking steps to ensure that the openings of the hollow fibers in the bundle are not plugged by resin, and placing the closely packed bundle into a cylindrical jacket. Such procedures are described in detail in Maxwell et al. U.S. Pat. 3,339,341, and Mahon U.S. Pat. 3,228,877.

Polymeric materials from which the hollow fibers are made are disclosed in the above-identical patents and include polyethylene terephthalate, polyvinyl chloride, polyvinylidene chloride, polyhexamethylene adipamide, copolymers of tetrafluoroethylene and hexafluoropropylene, cellulose acetate, ethyl cellulose, polystyrene, copolymers of butadiene and styrene, cellulose esters, cellulose ethers, acrylonitriles, polyvinyl formulas and butyrals, polyolefins, polyurethanes, polyamides and the like.

It is an object of this invention to provide an improved permeation separation apparatus for contacting the surfaces of small, essentially parallel hollow fibers in a bundle with a fluid mixture or solution by a permeation process.

SUMMARY OF THE INVENTION

A permeation separation apparatus for separating components of a fluid, which apparatus comprises in combination, (A)

An elongated fluid-tight jacket, having an open first end and a second end closed by said jacket,
Said first end closed by a fluid-tight cast wall member;

(B)

A plurality of hollow fibers positioned longitudinally within said elongated jacket, Said fibers extending substantially the length of said jacket and forming a loop adjacent the second closed end of said jacket with both ends of each of said fibers embedded in and extending through said cast wall member in fluid-tight relationship thereto, Said fibers comprising a bundle surrounded by at least one elongated flexible porous sleeve member extending longitudinally the substantial length of said bundle, said bundle substantially filling the interior of said jacket;

(C)

An outer closure member cooperating with said jacket and said cast wall member which, with said cast wall member, defines a chamber that is in communication with the open ends of each hollow fiber;

(D)

A multiply perforated tube extending through at least one end of said jacket in fluid-tight relationship thereto, said tube positioned within said bundle along approximately the center axis of said bundle and extending substantially the longitudinal length of said bundle, The perforations of said perforated tube being spaced around the circumference of said tube and along the length of the portion of said tube that is within said bundle, Said tube constructed and arranged such that its interior communicates with the interior of said jacket only at the openings provided by said perforations, and such that its interior does not communicate with the chamber defined by said outer closure member and said cast wall member;

(E)

Said jacket having conduit means to permit movement of fluid between the interior of said jacket and an area outside said jacket; and (F)

Said outer closure member having conduit means to permit movement of fluid out of the chamber defined by said outer closure member and said cast wall member.

DESCRIPTION OF THE DRAWINGS

FIG. 1 is a longitudinal cross-sectional view of one embodiment of a permeation separation apparatus of this invention.

FIG. 2 is a longitudinal cross-sectional view of another embodiment of a permeation separation apparatus of this invention.

FIG. 3 is a longitudinal cross-sectional view of another embodiment of a permeation separation apparatus of this invention.

FIG. 4 is a longitudinal cross-sectional view of another embodiment of a permeation separation apparatus of this invention.

FIG. 5 is a longitudinal cross-sectional view of still another embodiment of a permeation separation apparatus of this invention.

FIG. 6 is a longitudinal cross-sectional view of still another embodiment of a permeation separation apparatus of this invention.

FIG. 7 is a longitudinal cross-sectional view of still another embodiment of a permeation separation apparatus of this invention.

DESCRIPTION OF THE INVENTION

Hitherto, permeation separation devices described in the art have required that hollow fibers be packed tightly into a jacket with means for introducing a fluid feed (typically a naturally occurring water which contains dissolved salts such as sodium sulfate, sodium chloride, magnesium chloride, magnesium sulfate or many others in various proportions, or a gas mixture) at a point near one end of the fiber bundle under pressure. In the case of such aqueous solutions, water passes through the walls of the hollow fibers more rapidly than will the dissolved salts. Purified water solution then exits from the open ends of the hollow fibers, and the remaining solution, having been rejected by the fiber walls, is enriched in the dissolved salts, and is allowed to exit from the jacket, usually at a point remote from the entrance port. Such permeation devices have been constructed and tested in sizes from fractions of an inch in diameter to 12″ and 14″ in diameter, and larger ones are contemplated. Among the materials which have been suggested for use in hollow fiber permeation devices are polystyrene, polyethylene, polyethylene terephthalate, polyvinyl chloride, polyvinylidene chloride, polyhexamethylene adipamide polyacrylonitrile, ethyl cellulose, cellulose propionate copolymers of tetrafluoroethylene and hexafluoropropylene, copolymers of acrylonitrile and vinyl chloride, and copolymers of butadiene and styrene. The effectiveness of very small permeation devices using very thin hollow fibers is usually significantly superior to similar large-size devices using such hollow fibers. The reduction in efficiency is attributed to the engineering problem of ensuring that the outside surface area of the small-diameter hollow fibers in the device is contacted with the feed fluid. The available surface area in a permeation device of the type described in U.S. Pat. 3,339,341 is very large, reaching in a 12″ diameter apparatus as much as 75,000 to 100,000 sq. ft. In the same patent, the ideal flow conditions for fluid treatment with this kind of permeation device are outlined, flow being visualized as occurring mainly in the narrow channels defined by the juxtaposed outer surfaces of the hollow fibers. In practice, considerably less than ideal flow conditions prevail for a number of reasons. Some flow channels may be blocked, by foreign matter, deformed fibers or other reason. Open channels at the side of the bundle may allow flow from inlet to outlet without proper contact of feed fluid with fiber surface. When flow is excessively restricted, the amount of salt left in the narrow flow channels may rise to the point of precipitation, which further restricts flow and compounds the difficulty of maintaining good flow patterns.

The difficulties described above are overcome by this invention which eliminates the necessity for complete flow of feed fluid down the narrow channels between the hollow fibers and induces cross flow throughout the bundle. This is accomplished by providing a perforated tube within the bundle in which the perforations comprise exit or inlet ports at a number of points along the length of the hollow fiber bundle, rather than at a point on the jacket of the device. Preferably the tube provides exitway for the fluid rejected by the hollow fibers and is inserted in the middle of the fiber bundle or at least well within its outer circumference. The tube may be fixed at either end of the permeation device or at both ends, so long as passage is allowed for the fluid reject from the inside of the jacket. The perforated tube will be referred to hereinafter either as such or as the reject exit tube or reject collection tube.

Referring now to the figures, it is seen that FIGS. 1-7 depict various embodiments of the apparatus of this invention and that many features of any one of these embodiments are common to each. Thus, some parts of each embodiment are common to all embodiments. These common parts include, referring now to FIG. 1 for convenience, a hollow fiber bundle containing a plurality of individual hollow fibers 10 placed inside jacket 15. The fibers are looped at one end of the jacket so that both ends of each fiber extend through cast wall block 12 and open into chamber 18 at 11. Chamber 18 is formed by outer closure member 28 which is constructed to abut portions of the cast wall 12 and jacket 15, and is rigidly attached thereto by flanges 26 and bolts 27. Gasket seal 13 and O-ring 14 provide fluid-tight seals.

Considering now the embodiment represented by FIG. 1, which is a preferred embodiment of this invention, a feed fluid is introduced at 16 through jacket 15 under pressure and contacts the outer walls of the hollow fibers 10 within the fiber bundle. Flow of feed proceeds in direction from 16 toward exit conduit 17 at the outside end of perforated tube 19, but also flows radially across the fibers from vertical channels between fibers toward the exit holes 21, 22, 23, 24, and 25 along tube 19. All of the reject fluid (fluid remaining after the permeate fluid has passed through the fiber walls) must exit through these holes and thence to exit 17 where a pressure let-down device (not shown) allows it to leave the apparatus at atmospheric (or other desired) pressure. The permeate having penetrated the fiber walls flows through the hollow fiber interiors and exits from the open fiber ends at 11 into chamber 18 and leaves the chamber at exit 20. The flow of fluids within the apparatus is termed countercurrent (i.e., the flow of the feed solution in the jacket travels in a direction opposite to the product solution in the hollow fibers). As indicated previously, the cast wall block is shown by 12, a gasket seal shown by 13 and an O-ring seal shown at 14. In order to direct the flow and to promote equal use of all the fibers, both the size and number of the outlet perforations in tube 19 and their location on the tube must be established, for if all perforations are of the same size, it will be seen that there should be fewer perforations near the feed port 16 than remote from it in order to force feed fluid into contact with the walls of the fibers 10 throughout the bundle. For a desired pressure drop between feed entrance 16 and exit 17 of tube 19, the following equation has been derived for perforations of $\frac{1}{16}$ inch in diameter (1) $$N=\frac{247g}{(\Delta P)^{1/2}}$$

where $N$ = Number of perforations
$g$ = flow rate in gallons per minute of reject fluid
$\Delta P$ = Pressure drop across the perforations in the perforated reject tube.

The above equation applies for dilute aqueous solutions in a permeation device with about 50% pack density (the number of fibers times the cross-sectional area of one fiber based on its outside diameter divided by the cross-sectional area of the jacket based on its inside diameter), using hollow fibers of 54 micron outside diameter. In such a device, the pressure drop between the inlet 16 and reject outlet at 17 should be between 10 lbs./sq. in. and 200 lbs./sq. in.

In determining a favorable plan for the location of perforations on the perforated tube, the following equation is useful:

$$Y_a = Y_{obs.} + \Delta Y$$

where $Y_{obs.}$ = observed conversion (volume of permeate divided by the volume of feed fluid) for the hollow fiber walls in an apparatus of the type described above;

$Y_a$ is the actual conversion for the same apparatus, assuming a part of the feed has channeled between the fibers and not contacted the fiber walls; and $\Delta Y$ is the difference which represents the inefficiency due to channeling. For permeation devices of various sizes which are similar to that of FIG. 1 except that they do not include the perforated tube, values of $\Delta Y$ when the devices are operated on dilute aqueous feed are shown as follows:

| Diameter of permeation device: | $\Delta Y$, percent |
| --- | --- |
| 4" | 11.7 |
| 6" | 13.8 |
| 14" | 27.0 |

Using the device of FIG. 1 in which the jacket size is 14" in diameter, $\Delta Y$ can be reduced to 8% to 10%, affording an improvement of from 70% to 63% in reducing the inefficiency due to channeling.

The perforations in the centrally located perforated reject tube are preferably located in the following pattern (in a permeation device of the FIG. 1 configuration):

(1) One perforation is in the very end of the tube facing the cast wall end of the device.

(2) There are no perforations for the next 5 to 10 percent of the length of the tube;

(3) In the remaining length of the tube that is within the fiber bundle, 20% to 50% of the total number of perforations are evenly arranged in the first 60% of such length.

(4) The remaining 80% to 50% of the perforations are evenly arranged in the last 40% of such length.

Even arrangement of perforations is not essential and in fact a gradual concentration of perforations toward the end of the perforated tube farthest from the fluid feed inlet is desirable; however, ease of fabrication makes even spacing convenient.

The arrangement of the perforations suggested above has the effect of forcing sufficient cross-flow (flow of entrance fluid perpendicular to the longitudinal axis of the hollow fibers) to provide mixing in a radial direction (a direction perpendicular to the length of the fibers) in the upper part of the fiber bundle, thus alleviating the effects of blanked flow paths and pockets of no-flow in the axial direction (along the axis of the fibers). The objective, however, is to force the maximum amount of flow concomitant with the above-mentioned radial mixing in the axial direction down the flow paths between the hollow fibers. In this way, efficient use is made of the maximum amount of fiber surface. The single perforation in the end of the perforated tube precludes the formation of a pocket of nonflowing feed fluid in the area where the hollow fibers enter the cast wall block 12.

Referring to another embodiment of the invention shown in FIG. 2, a feed fluid is introduced at inlet 31 in jacket 15 under pressure and contacts the walls of the hollow fiber walls 10. Flow of fluid proceeds in direction from 31 toward the end of perforated tube 39 near perforations 44, but also flows radially across the bundle toward the exit perforations at 41, 42, 43 and 44. All of the reject fluid exits through these perforations and thence out exit 33, where a pressure let-down device (not shown) allows it to leave the vessel at the desired pressure.

The device of FIG. 2 differs from that of FIG. 1 in that perforated tube 39 extends through the cast wall block 12. The open ends of the hollow fibers are at 11, and permeate fluid passes into chamber 40 and out conduit 34. A gasket seal at 13 and an O-ring seal at 14 provide fluid-tight seals.

Referring now to a third exemplification of the invention as shown in FIG. 3, feed fluid is introduced under pressure at inlet 51 in jacket 15 and contacts the walls of the hollow fibers 10. The flow proceeds in direction from 51 toward perforations 61, 62, 63, and 64 and thence inside the perforated tube 59 toward the outlet at 53. This is cocurrent flow (the fluid outside the fibers travels in the same direction as the fluid within). In this case, the arrangement of the perforations in the perforated tube is reversed from that of FIG. 1, a larger number being concentrated toward the cast wall 12 end of the apparatus. The arrangement still conforms to the rule that fewer perforations be available in the perforated tube near the feed point and a higher number at the other end of the tube. The permeate product exits from the open ends of the hollow fibers at 11 into chamber 50 and leaves the apparatus at 54. The gasket seal is represented at 13 and an O-ring seal at 14. The outer closure member is represented by 28.

A fourth exemplification of the invention is shown in FIG. 4. Here, feed fluid enters at conduit 71 in jacket 15 and after contacting the outside of the hollow fibers 10 in the bundle exits through perforations 81, 82 and 83 in perforated tube 79 and thence from the apparatus at 73 through a pressure let-down device (not shown). This device differs from that of FIG. 3 in that the perforated reject collection tube 79 is attached to the cast wall 12 end of the device as in FIG. 2. The arrangement of the exit preforations is as in FIG. 3. Permeate exits from the open ends of the hollow fibers at 11 into chamber 70 and thence from the apparatus at 74. The outer closure member is shown by 28, a gasket seal at 13, and an O-ring seal at 14.

In FIG. 5 is shown a device in which the perforated tube 99 is attached at both ends of the apparatus so that the reject fluid exits at both exits 93 and 105 of the tube 99. Feed fluid is introduced at conduit 91 in jacket 15 and the arrangement of outlet perforations 101, 102, 103, and 104 on the perforated exit tube 99 is the same as in FIG. 2. The flow is countercurrent. The permeate exits from the open ends of the hollow fibers at 11 into chamber 100 and thence from the apparatus at 94. The outer closure member is shown at 28, a gasket seal at 13 and an O-ring seal at 14.

In FIG. 6 the perforated tube 119 is again attached at both ends as in FIG. 5; however, the feed fluid is introduced at conduit 111 in jacket 15 and the flow is cocurrent. The holes at 121, 122, 123 and 124 in the perforated tube are arranged as in FIG. 4. Reject exits from the device at 113 and 125 through tube 119 through pressure let-down valves (not shown). Permeate exits from the open ends of the hollow fibers at 11 into chamber 120 and thence from the apparatus at 114. The outer closure member is shown as 28, a gasket seal at 13 and an O-ring seal at 14.

In FIG. 7 the perforated tube 139 is attached at both ends of the device. Feed is introduced at conduit 131 on jacket 15 at the midpoint of the fiber bundle; therefore, about half the flow is cocurrent and half countercurrent. In this device three rows of 4 holes each are spaced evenly directly across from the feed port at 143. Of the remaining perforations, one-half are located one way from the center at 141 and 142 and one-half the other way at 144 and 145. In each half, 50% to 20% of the perforations are evenly spaced in rows of 4 starting from the nearest center row of perforations, and 50%-80% of the perforations are spaced evenly over the remainder of the portion perforated tube that is within the fiber bundle. Permeate exits through the open ends of the hollow fibers at 11 into chamber 140 and thence from the apparatus at 134, and rejected feed fluid exits through the perforations in the tube and thence from the apparatus at 133 and 145 through pressure let-down valves (not shown). The cast wall is shown at 12, the outer chamber member by 28, a gasket seal at 13 and an O-ring seal at 14.

If the flow of feed fluid and reject fluid down the channels between the exterior walls of the hollow fibers is termed axial flow (i.e., parallel to the longitudinal axis of the fibers within the fiber bundle), the flow in the devices of this invention may be termed semiaxial since a portion of such flow is from the periphery of the bundle to the perforated tube in the center of the bundle. Thus a pluggage in a channel between hollow fibers in a permeation separation apparatus that does not contain the perforated tube causes a decrease in efficiency since fiber walls below the stoppage or pluggage point will not be contacted by the feed fluid. However, the semiaxial flow pattern in the apparatus of this invention provides movement of fluid across the fibers so that the stoppage point is by-passed.

The jacket of the apparatus may be made with any suitable transverse cross-sectional configuration and of any suitable compatible material of sufficient strength. Preferably, the jacket is cylindrical. Cylindrical metallic housings, for example, steel pipe, are satisfactory, being reasonably easy to produce and assemble. The size of the tubular jacket may vary from less than one inch to many inches in diameter, and may vary from about one to many feet in length.

An idea of the construction of the hollow fibers is indicated by the fact that in a jacket that is about six inches in diameter and eight feet long, about twelve million hollow fibers have been packed therein to result in an effective membrane surface (outer walls) of about 20,000 square feet.

The hollow fibers may be prepared by melt extrusion through circular dies and spinnerets as taught in French Pat. 990,726 and British Pat. 859,814. Hollow fibers of textile size are preferably made by melt spinning the polymer, e.g., nylon 66 with a screw melter, a sand filter pack, and a sheath-core spinneret of the type shown in U.S. Pat. 2,999,296. Fibers of suitable size are obtained with spinnerets having plate hole diameters near 40 mils and insert diameters near 35 mils by adjustment of melter, sand pack, and spinneret temperatures, air quench and wind-up speed.

The hollow fibers useful herein generally have outside diameters of about 10–250 (preferably 15–150) microns and wall thicknesses of about 2–75 (preferably 5–40) microns. In general, the fibers with smaller outside diameters should have thinner walls so that the ratio of the cross-sectional area of the internal bore of the fiber to the total cross-sectional area within the outer perimeter of the fiber is about 0.12–0.60; i.e., about 0.12:1 to 0.60:1. Preferably, the ratio is about 0.18–0.45 to 1. The composition of the fibers has been discussed above. Preferably, the fibers are polyamide fibers modified as described in U.S. patent application Ser. No. 674,425, filed Oct. 11, 1967, and now abandoned, and U.S. Pat. 3,497,451. Exemplary modification includes modification with protonic acids (e.g., formic) or lyotropic salts and the like, as described more fully in said applications.

It has been found that the most convenient configuration of the hollow fibers inside the jacket is that wherein the fibers form a U shape, as shown in the figures, so that both ends of the fibers exit from the jacket at the same end thereof. Such a configuration can be conveniently obtained by spinning or extruding the hollow fiber into one continuous yarn or filament which is wound to form a hank of a desired length and width (which will depend upon the length and width of the jacket). The preparation of the hanks is described in detail in U.S. Pat. 3,339,341. The hanks are drawn and elongated by means of hooks and a flexible porous sleeve or sleeves pulled over the elongated hank to aid in subsequent handling of the fiber bundle.

The flexible porous sleeves which are drawn over the loose hanks may be made of any suitable material, natural, reconstituted, or synthetic, of suitable strength and compatible with the fluid mixture being handled, the polymer from which the hollow filaments are made, the material forming the cast wall members, and the other materials with which the sleeve will come in contact. The sleeve members may be of any practical construction which is porous and flexible. Preferably the sleeve members should be of a strong abrasion resistant material, or a construction, which is capable of shrinkage or shortening at least in the transverse peripheral dimension to give a uniform constraining compacting action on and along an enclosed bundle or group of filaments. A preferred construction is a circularly knit fabric sleeve of a suitable material such as cotton thread or a polyester fabric, for example, which sleeve is capable of considerable reduction in transverse peripheral dimension when the sleeve is placed under tension longitudinally. This sleeve is especially advantageous, for when tension is exerted on such a sleeve surrounding a bundle to pull a filament bundle into a tubular jacket, the tension also results in uniformly compacting and reducing the bundle cross section along the bundle length to facilitate positioning the bundle in such a jacket without flattening or damaging the filaments of the bundle. The sleeves may also be made of woven or non-woven fabric, or of punched or cut cylindrical tubes, or tubes of netting. The ability of the sleeve member to shrink or reduce its radius or circumference uniformly and evenly is desirable.

Once the sleeve or sleeves are placed around the fiber bundle hank, one end of the hank is placed in a suitable mold while a solidifiable material is molded around that end of the hank to form the cast wall member or block. A suitable molding resin which provides good strength is a mixture of an epoxy polymer modified with butyl glycidyl ether, a modified aliphatic amine adduct and triphenyl phosphite. After solidification, the "potted" hank is removed from the mold. The "pot" or cast wall member can then be sliced or cut, as described in Maxwell U.S. 3,339,341 and Geary et al. U.S. Pat No. 3,442,002 so that the open ends of the hollow fibers communicate with the atmosphere.

The cast wall block may be reinforced by providing a metal frame in the form of a spoked wheel or other suitable configuration embedded therein by placing it in the mold used to form the block and then pouring the solidifiable resin into the mold formed by the wheel, and curing. A large variety of plastics such as polyester, phenolics, melamines, silicones and others are suitable as solidifiable resins, although epoxy resin is preferred. The cast wall block is thereafter handled as a unit, the individual bundles of hollow fibers being constrained to a large bundle for ease in handling. The cast wall block may be backed up by a sturdy metal cap of the same diameter if desired which provides increased strength to resist the pressure of the feed fluid inside the jacket of the permeation apparatus. The metal cap is separated from the surface containing the open ends of the hollow fibers by a space such as a screen to allow free flow of the permeate from the fiber openings to the exit conduit of the permeate collection chamber. This type of construction produces a savings of the material used in construction of the epoxy cast wall block, because of the strength provided by the metal frame and/or the metal backup plate. More effective use is also made of the available hollow fiber surface, as much less of it is sealed inside the cast wall block and more is available for use in permeation separation. The cast wall block is originally of a larger diameter than the jacket making up the body of the apparatus, the connection between the block and jacket being made through a flanged or welded reducer. The jacket is sized so that the hollow fiber bundle will fit tightly as a unit in the jacket, deriving support from the side walls and effectively delimiting the open feed channels between adjacent hollow-fiber walls. The looped ends of the bundled fibers (at the end away from the epoxy cast wall block) may be drawn into the jacket, and the other end of the jacket attached to the outer closure member by welding or by flanged fitting.

However, prior to the fitting the fiber bundle in the jacket, the fibers are treated chemically, if desired, as described above and more fully in U.S. patent application Ser. No. 674,425, filed Oct. 11, 1967, and now abandoned and U.S. Pat. 3,497,451.

Also prior to fitting the fiber bundle in the jacket, the perforated tube is inserted longitudinally along the axis of the bundle in about the center of the bundle. Most conveniently a sleeve, of the same construction as the sleeves surrounding the bundle but of a smaller diameter, is placed in the fiber bundle along its longitudinal center axis during formation of the bundle. This sleeve aids in the insertion of the perforated tube since the tube can be inserted inside the sleeve and pushed into the bundle without difficulty by using the sleeve as a guide. The sleeve may be permanently cast in the cast wall block or may be affixed to the tube itself.

The tube may be of any suitable length. It will preferably extend into the bundle for almost the length of the bundle. For devices of commercial size, i.e., 4″ to 14″ diameter or more, the tube may be of ¼″ to 1″ diameter, or even larger as larger permeation bundles are utilized. The exit ports in the tube may be as small as 1 to 200 microns in diameter, or as large as 1/64″, 1/8″ or 1/4″ in diameter in larger devices. The perforations in the exit tube must be small enough and few enough to limit flow from the bundle to the inside of the tube. There is some reduction in pressure in passing fluid from the bundle or through the exit ports to the bore of the reject exit tube.

It is this pressure difference that provides the aspirating action which tends to equalize flow over the length of the bundle and promotes uniform contact throughout. Location and grouping of the perforations are subject to test and adjustment depending on the properties of the hollow fibers used, the performance desired, the nature of the fluid being purified and other criteria. They may be evenly spaced or may be grouped or arranged in order as desired. The number of perforations is not limited to any maximum number or minimum number. As described in the discussion of the figures above, more perforations should be placed at areas of the tube farthest away from the area of entry of fluid feed in the jacket interior than are placed at the portion of the tube that is closely adjacent the area of entry of the fluid feed. The tube may be fabricated from any material resistant to corrosion, e.g., inert plastic, fiberglass, ceramic ware, or steel. When the perforations are of small size, measured in microns, the tube may be made of linear, high-density polyethylene (having pores 35–100 microns in size) or sintered stainless steel (having pores 1–200 microns in size).

The fibers of the bundle must be packed tightly around the perforated tube, for if they are not, open spaces will appear, and the effectiveness of the tube lost, for such open spaces break up the controlled flow of feed fluid through the bundle to the perforated exit tube.

Since flow patterns through the bundle are thus dictated by size, number and pattern of the holes in the distributor pipe, the effects of nonuniform density of fibers in the bundle are diminished. In a broad sense therefore the invention may be described as an internally located flow distributor to force desired (not necessarily uniform) flow patterns in separation devices of the described configuration where fiber bundles are of either nonuniform or uniform density.

Once the tube is in place in the bundle, the bundle is drawn, looped end first, into the jacket. The cast wall block end of the bundle is fitted into the jacket to close that end and the outer closure member fitted to the jacket. Likewise, the portion of the perforated tube protruding from the opposite end of the jacket is sealed to the jacket by welding or suitable flanges and gaskets.

Preparation of the apparatus especially the fibers, cast end block, and procedures of assembly are further described in Maxwell et al. U.S. Pat. 3,339,341, and in Geary et al. U.S. Pat. 3,442,002.

The apparatus of this invention may be located and operated in a horizontal, vertical, or an intermediate position with respect to ground level. The construction of the apparatus wherein both ends of the fibers are suspended from the single cast wall members, as described herein, offers unusual advantages, especially in gaseous separations, when operated in a vertical position. Gaseous feeds from which hydrogen or other gas is to be separated frequently contain a relatively high proportion of hydrocarbons in the $C_1$ to $C_{10}$ range. Under the conditions of elevated pressure and gradual removal of hydrogen inside the permeation separation device (the feed being outside the polymeric hollow fibers), these hydrocarbons tend to condense within the fiber bundle, blocking the fluid passageways and decreasing the permeation efficiency. Vertical operation of the device uses the force of gravity to facilitate drainage of the condensate from the fiber bundle to the bottom of the device whence it can be easily removed.

When operating with certain liquid feeds, for example, water containing impurities in the form of bicarbonates, sulfates or water containing dissolved gases, similar advantages are gained. Noncondensable gases are more easily freed from interstices in the bundle fibers and can be vented from the top of the device. Vertical operation with liquid feed also helps to cancel out any pockets or dead spaces in the fiber bundle, as the force of gravity tends to urge liquid flow through such areas where horizontal operation might allow settling, salt precipitation and other undesirable developments. The flow-directing devices of the instant invention improve performance in both horizontal and vertical installations.

Treated polyamide hollow fibers are effective to produce potable water in most communities having brackish sulfate water supplies containing more than 250 p.p.m. sulfate impurity level. The hollow fibers can be used to remove a wide variety of other materials from aqueous mixtures. Typical components which can be separated from liquid mixtures containing water using the treated membranes taught herein include inorganic salts containing anions such as sulfate, phosphate, fluoride, bromide, chloride, nitrate, chromate, borate, carbonate, bicarbonate and thiosulfate, and cations such as sodium, potassium, magnesium, calcium, ferrous, ferric manganous and cupric; organic materials such as glucose, phenols, sulfonated aromatics, lignin, alcohols and dyes; and difficultly filterable insoluble materials including viruses and bacteria such as coliform and aerogene. Specific applications for these separations include the purification of saline brackish and waste waters; recovery of minerals from sea water; water softening, artificial kidney; sterilization; isolation of virus and bacteria; fractionation of blood; and concentration of alkaloids, glucosides, serums, hormones, vitamins; vaccines, amino acids, antiserums, antiseptics, proteins, organometallic compounds, antibiotics, fruit and vegetable juices, sugar solutions, milk, and extracts of coffee and tea, as well as many others.

Preferably, the treated hollow fiber membranes described herein are used to purify water containing one or more dissolved inorganic salts, and most preferably sulfate or phosphate salts.

It will be understood that the rate of water permeation in aqueous systems is proportional to the difference between the applied pressure and permeate outlet pressure minus the osmotic pressure of the solution. Thus high applied pressure and low outlet pressure will promote high permeation rate. Rate is usually expressed as gallons per sq. ft. of fiber surface per day. Performance is frequently measured in terms of percent salt rejection, a high figure indicating a high degree of purification. Another frequently used performance measure is conversion—the proportion of the feed volume which exists from the apparatus as permeate product. Conversion can be controlled to a large extent by controlling the outflow of rejected feed.

Because of flow resistance in the fiber bundle inside the jacket of the permeation device there is a pressure drop from the feed point to the point where rejected feed exists. In general it is desired that this pressure drop be quite low in order to minimize mechanical wear and attrition on the fibers. A pressure letdown device is commonly used between the perforated collection tube outlet and the atmosphere.

In the examples which follow, the feed fluid used was an aqueous solution of sulfate salts, called "mixed sulfates" of the following composition:

.75 gram per liter of sodium sulfate
.75 gram per liter of magnesium sulfate

The solution was applied to the jacket interior at a pressure of 600 lbs./sq.in.

The permeation devices employed were fourteen inches in jacket diameter and about nine feet in jacket length. Overall device length was about ten feet.

EXAMPLE 1

A permeation device of the type shown in FIG. 1 except that it did not contain tube 19 was tested using countercurrent flow. The same device then was fitted with a central tube 19 for removing reject fluid and was tested as described for FIG. 1. The approximate pack density of the hollow fiber bundle was 48%. The active length of the bundle 6.19 ft. and the calculated available active surface area was 76,098 sq. ft. Results at comparable values for percent conversion are shown below in Table I. The $\frac{1}{16}$"-diameter perforations in this reject tube 19 were located in evenly spaced rows of 6 around the tube, the rows being 1½" apart from 1 ft. below the cast wall member to the bottom end of the looped hollow fiber bundle. Overall length of the tube was about 95 inches.

TABLE I

| | Conversion, percent | Pressure drop, lbs./sq. in. | Flux gals./ ft.² day | Rejection, percent |
|---|---|---|---|---|
| Device with no tube (19) present | 30 | 58 | .085 | 81.1 |
| | 50 | 42 | .089 | 76.2 |
| | 70 | 30 | .093 | 2.4 |
| Device of Figure I | 30 | 20 | .087 | 86.6 |
| | 50 | 10 | .089 | 83.9 |
| | 70 | 5.5 | .089 | 76.1 |

The improvement in overall salt rejection with comparable conversion and flux is shown.

EXAMPLE 2

A permeation device of the type shown in FIG. 1 was tested using a 95-inch long perforated reject tube with $\frac{1}{16}$" diameter holes. One perforation was at the tip of the tube 1 ft. below the cast wall end, the next 42" of the tube had rows of perforations 4 round in rows 3" apart down the tube. The remaining 30 inches of tube had rows of perforations 4 round in rows 2" apart down the tube. This apparatus had a pack density of about 46%. The active length of the fiber bundle was 80" and the calculated surface area 79,932 ft.². Data are shown in Table II.

TABLE II

| Conversion, percent | Pressure drop, lbs./sq. inch | Flux, Gals./ ft.² day | Salt rejection, percent |
|---|---|---|---|
| 50 | 10 | .073 | 89.4 |
| 50 | 50 | .063 | 82.6 |
| 50 | 228 | .068 | 92.8 |
| 50 | 360 | .066 | 91.2 |
| 70 | 17 | .070 | 85.6 |
| 80 | 22 | .067 | 85.3 |
| 90 | 13 | .073 | 83.8 |

The salt rejection at comparable pressure drop is seen to be better than in the device of Example 1 where the reject tube had evenly spaced perforations.

Although the perforated tube has been described herein as providing exit means for the reject fluid resulting from the operation of the permeation separatory devices of this invention, the tube can operate as an inlet for the fluid feed mixture in which case the reject fluid exits through the conduit in the jacket.

Moreover, two perforated tubes can be employed in place of the one described in the figures by fitting one tube of a slightly smaller diameter inside the other. The area and number of the perforations can thus be varied by turning one tube within the other so as to move the perforations of each tube in and out of alignment with the other. Additionally, in this two tube embodiment, the inner placed tube may be nonperforated and the fluid feed entered into the interior of the jacket through it. Reject feed would then exit through the perforations in the outermost tube.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A permeation separation apparatus for separating components of a fluid which apparatus comprises in combination,
   (A) an elongated fluid-tight jacket, having an open first end and a second end closed by said jacket,
      said first end closed by a fluid-tight cast wall member;

(B) a plurality of selectively permeable hollow fibers positioned longitudinally within said elongated jacket, said fibers extending practically the length of said jacket and forming a loop adjacent the second closed end of said jacket with both ends of each of said fibers embedded in and extending through said cast wall member in fluid-tight relationship thereto, said fibers comprising a bundle maintained as a coherent unit by at least one elongated flexible porous sleeve member extending longitudinally along the length of said bundle, said bundle being tightly packed into the interior of said jacket and being in contact with the interior walls of said jacket;

(C) an outer closure member cooperating with said jacket and said cast wall member which, with said cast wall member, defines a chamber that is in communication with the open ends of each hollow fiber;

(D) a multiply perforated tube extending through at least one end of said jacket in fluid-tight relationship thereto, said tube positioned within said bundle along approximately the center axis of said bundle and extending substantially the longitudinal length of said bundle, the perforations of said perforated tube being substantially the same diameter and being concentrated in a progressive manner toward the end of the tube that is farthest from said conduit, said tube constructed and arranged such that its interior communicates with the interior of said jacket only at the openings provided by said perforations, and such that its interior does not communicate with the chamber defined by said outer closure member and said cast wall member;

(E) said jacket having conduit means separate from said perforated tube to permit movement of fluid between the interior of said jacket and an area outside said jacket; and (F) said outer closure member having conduit means to permit movement of fluid out of the chamber defined by said outer closure member and said cast wall member.

2. The apparatus of claim 1 wherein the perforated tube extends into said jacket through the second end of the jacket and terminates within the jacket.

3. The apparatus of claim 1 wherein the perforated tube extends into said jacket through the cast wall member and terminates within the jacket.

4. The apparatus of claim 1 wherein the perforated tube extends into the jacket through both said ends of the jacket.

5. The apparatus of claim 2 wherein the conduit means to permit movement of fluid between the interior of said jacket and an area outside said jacket is positioned on said jacket closely adjacent the cast wall member.

6. The apparatus of claim 5 wherein said perforated tube contains;

one perforation in the end of the tube facing the cast wall member, no perforations in the next 5–10 percent of the length of said tube, 20–50 percent of the total number of perforations evenly arranged in the first 60 percent of the remaining length of said tube, and 80–50 percent of the total number of perforations evenly spaced in the last 40 percent of the remaining length of said tube.

7. The apparatus of claim 1 wherein said hollow fibers have an outside diameter of between about 10–250 microns and a wall thickness of between about 2–75 microns.

8. The apparatus of claim 7 wherein said fibers are prepared from polyamide polymeric resins.

9. The apparatus of claim 1 wherein the jacket is cylindrical and has a diameter of between about 1 inch to about 14 inches, and wherein the perforated tube has a diameter of between about ¼ inch to about 1 inch.

10. The apparatus of claim 5 wherein said perforations are sized and spaced to provide a substantially equal fluid pressure drop between the pressure of the fluid at said conduit and the pressure of the fluid at each perforation.

References Cited

UNITED STATES PATENTS 3,226,915   1/1966   Pinney _____ 55—158

REUBEN FRIEDMAN, Primary Examiner

R. BARNES, Assistant Examiner